United States Patent
Immonen et al.

(10) Patent No.: US 12,273,867 B2
(45) Date of Patent: *Apr. 8, 2025

(54) SYSTEM AND METHOD FOR UTILIZING OVERLAPPING COMPONENT CARRIERS

(71) Applicant: DISH Wireless L.L.C., Englewood, CO (US)

(72) Inventors: Antti Immonen, Helsinki (FI); Mehdi Alasti, Reston, VA (US); Siddhartha Chenumolu, Broadlands, VA (US); Abdulrauf Hafeez, Cary, NC (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/383,817

(22) Filed: Oct. 25, 2023

(65) Prior Publication Data
US 2024/0057053 A1 Feb. 15, 2024

Related U.S. Application Data

(63) Continuation of application No. 17/559,700, filed on Dec. 22, 2021, now Pat. No. 11,838,901, which is a
(Continued)

(51) Int. Cl.
*H04W 72/0453* (2023.01)
*H04L 1/00* (2006.01)
(Continued)

(52) U.S. Cl.
CPC ....... *H04W 72/0453* (2013.01); *H04L 1/0071* (2013.01); *H04W 16/24* (2013.01);
(Continued)

(58) Field of Classification Search
CPC ............. H04W 74/0833; H04W 16/24; H04W 56/001; H04W 76/15; H04W 72/0453;
(Continued)

(56) References Cited

U.S. PATENT DOCUMENTS 11,050,531 B2 * 6/2021 Damnjanovic ....... H04L 5/0096
11,997,053 B2 * 5/2024 Lee ....................... H04L 5/0055
(Continued)

FOREIGN PATENT DOCUMENTS

EP 3528570 A1 8/2019
JP 2019-140512 A 8/2019
(Continued)

OTHER PUBLICATIONS

Hunter, I., "Theory and design of microwave filters", The Institution of Electrical Engineers, 2001. (2 pages).
(Continued)

*Primary Examiner* — Brian D Nguyen
(74) *Attorney, Agent, or Firm* — Jeremiah J. Baunach; Frontier IP Law PLLC

(57) ABSTRACT

A new radio base station establishes a first and a second component. The first and second component carrier overlap each other. The base station transmits first synchronization signal blocks on the first component carrier. The base station transmits second synchronization signal blocks on the second component carrier interleaved in time with the first synchronization signal blocks.

17 Claims, 10 Drawing Sheets

Related U.S. Application Data continuation of application No. 16/719,657, filed on Dec. 18, 2019, now Pat. No. 11,246,136.

(51) Int. Cl.
  *H04W 16/24* (2009.01)
  *H04W 56/00* (2009.01)
  *H04W 74/08* (2024.01)
  *H04W 74/0833* (2024.01)
  *H04W 76/15* (2018.01)
  *H04W 88/08* (2009.01)

(52) U.S. Cl.
  CPC ..... *H04W 56/001* (2013.01); *H04W 74/0833* (2013.01); *H04W 76/15* (2018.02); *H04W 88/08* (2013.01)

(58) Field of Classification Search
  CPC ...... H04W 88/08; H04L 5/0078; H04L 5/001; H04L 1/0071; H04L 5/0044; H04L 5/0053
  See application file for complete search history.

(56) References Cited

U.S. PATENT DOCUMENTS

| | | | |
|---|---|---|---|
| 12,075,405 B2 * | 8/2024 | Choi | H04W 72/1268 |
| 2013/0106509 A1 | 5/2013 | Chen et al. | |
| 2014/0148107 A1 | 5/2014 | Maltsev et al. | |
| 2015/0373655 A1 | 12/2015 | Takano | |
| 2018/0359686 A1 | 12/2018 | Uchiyama et al. | |
| 2019/0037508 A1 | 1/2019 | Sun et al. | |
| 2019/0132789 A1 | 5/2019 | Uchiyama et al. | |
| 2019/0215215 A1 | 7/2019 | Maltsev et al. | |
| 2019/0261372 A1 | 8/2019 | Zhou et al. | |
| 2020/0145854 A1 * | 5/2020 | Harada | H04W 56/00 |
| 2020/0274656 A1 | 8/2020 | Gordaychik | |
| 2020/0314844 A1 | 10/2020 | Tomeba et al. | |
| 2021/0045076 A1 | 2/2021 | Tomeba et al. | |
| 2021/0058218 A1 * | 2/2021 | Harada | H04W 72/0453 |
| 2021/0058822 A1 | 2/2021 | Ly et al. | |
| 2021/0067977 A1 | 3/2021 | Martin | |
| 2021/0084604 A1 | 3/2021 | Weijie | |
| 2021/0144716 A1 | 5/2021 | Choi et al. | |
| 2021/0328733 A1 | 10/2021 | Zhang et al. | |
| 2022/0232570 A1 | 7/2022 | Cao et al. | |
| 2023/0009220 A1 | 1/2023 | Cao et al. | |
| 2023/0028119 A1 | 1/2023 | Gao et al. | |

FOREIGN PATENT DOCUMENTS

| | | |
|---|---|---|
| WO | 2015/163133 A1 | 10/2015 |
| WO | 2018/198343 A1 | 11/2018 |

OTHER PUBLICATIONS

International Search Report and Written Opinion received for PCT Patent Application No. PCT/US2020/065359, mailed on Mar. 3, 2021, 11 pages.

International Preliminary Report on Patentability received for PCT Patent Application No. PCT/US2020/065359, mailed on Jun. 30, 2022, 10 pages.

Office Action received for Japanese Patent Application No. 2022-537434, mailed on Jun. 20, 2023, 9 pages (5 pages of English Translation and 4 pages of Original Document).

* cited by examiner

500

502

ESTABLISHING, WITH A BASE STATION, A FIRST COMPONENT CARRIER HAVING A FIRST FREQUENCY BAND

504

ESTABLISHING, WITH THE BASE STATION, A SECOND COMPONENT CARRIER HAVING A SECOND FREQUENCY BAND THAT OVERLAPS THE FIRST FREQUENCY BAND

506

TRANSMITTING, FROM THE BASE STATION, FIRST SYNCHRONIZATION SIGNAL BLOCKS IN THE FIRST FREQUENCY BAND

508

TRANSMITTING, FROM THE BASE STATION, SECOND SYNCHRONIZATION SIGNAL BLOCKS IN THE SECOND FREQUENCY BAND AND INTERLEAVED IN TIME WITH THE FIRST SYNCHRONIZATION SIGNAL BLOCKS

ESTABLISH, WITH A NEW RADIO COMPLIANT BASE STATION, A FIRST COMPONENT CARRIER HAVING A FIRST FREQUENCY BANDWIDTH

604

ESTABLISH, WITH THE BASE STATION, A SECOND COMPONENT HAVING A SECOND FREQUENCY BANDWIDTH THAT OVERLAPS WITH THE FIRST FREQUENCY BANDWIDTH

606

TRANSMIT, FROM THE BASE STATION, FIRST SYNCHRONIZATION SIGNAL BLOCKS ON THE FIRST COMPONENT CARRIER

608

TRANSMIT, FROM THE BASE STATION, SECOND SYNCHRONIZATION SIGNAL BLOCKS ON THE SECOND COMPONENT CARRIER AND INTERLEAVED IN TIME WITH THE FIRST SYNCHRONIZATION SIGNAL BLOCKS

610

ADJUST A PERIODICITY OF THE SECOND SYNCHRONIZATION SIGNAL BLOCKS FROM A DEFAULT PERIODICITY RESPONSIVE TO A LOAD IMBALANCE BETWEEN THE FIRST AND SECOND COMPONENT CARRIERS

Figure 6

SYSTEM AND METHOD FOR UTILIZING OVERLAPPING COMPONENT CARRIERS

BACKGROUND

Technical Field

The present disclosure relates to mobile wireless communication systems, and more particularly relates to mobile communication systems that employ overlapping Component Carriers

Description of the Related Art

Wireless mobile communication technology uses various standards and protocols to transmit data between a base station and user equipment (UE). Wireless wide area network communication system standards and protocols can include, for example, the $3^{rd}$ Generation Partnership Project (3GPP).

Current 3GPP specifications support component carrier bandwidths of 5 MHz, 10 MHz, 15, MHz or 20 MHz. Individual component carriers, however, to meet the International Mobile Telecommunications Advanced (IMT-Advanced) requirements for very high data rates, the concept of carrier aggregation has been introduced to support bandwidths larger than 20 MHz. Currently, the carrier aggregation concept allows five component carriers of the same frame structure to be aggregated such that the total bandwidth available to a mobile terminal is the sum of the bandwidths of the cells. As used herein, a component carrier may be referred to as a cell.

BRIEF SUMMARY

In one embodiment a method for operating a base station includes establishing, with a base station, a first component carrier having a first frequency band. The method includes establishing, with the base station, a second component carrier having a second frequency band that overlaps the first frequency band. The method includes transmitting, from the base station, first synchronization signal blocks in the first frequency band and transmitting, from the base station, second synchronization signal blocks in the second frequency band and interleaved in time with the first synchronization signal blocks.

In one embodiment, a method for operating a base station includes establishing, with a new radio compliant base station, a first component carrier having a first frequency bandwidth. The method includes establishing, with the base station, a second component carrier having a second frequency bandwidth that overlaps with the first frequency bandwidth. The method includes transmitting, from the base station, first synchronization signal blocks on the first component carrier and transmitting, from the base station, second synchronization signal blocks on the second component carrier and interleaved in time with the first synchronization signal blocks. The method includes adjusting a periodicity of the second synchronization signal blocks from a default periodicity responsive to a load imbalance between the first and second component carriers.

In one embodiment, a new radio compliant base station includes a transceiver configured to transmit and receive signals, one or more processors coupled to the transceiver, and one or computer readable media including instructions that, when executed by the one or more processors, perform a process. The process includes establishing, at least in part with the transceiver, a first component carrier having a first frequency band and establishing, at least in part with the transceiver, a second component carrier having a second frequency band that overlaps with the first frequency band. The process includes transmitting, from the base station, first synchronization signal blocks in the first frequency band and transmitting, from the base station, second synchronization signal blocks in the second frequency band and interleaved in time with the first synchronization signal blocks.

BRIEF DESCRIPTION OF THE SEVERAL VIEWS OF THE DRAWINGS

FIG. 5 is a flow diagram of a method for operating a mobile communication network base station, according to one embodiment.

FIG. 6 is a flow diagram of a method for operating a mobile communication network base station, according to one embodiment.

DETAILED DESCRIPTION

Figure 1:
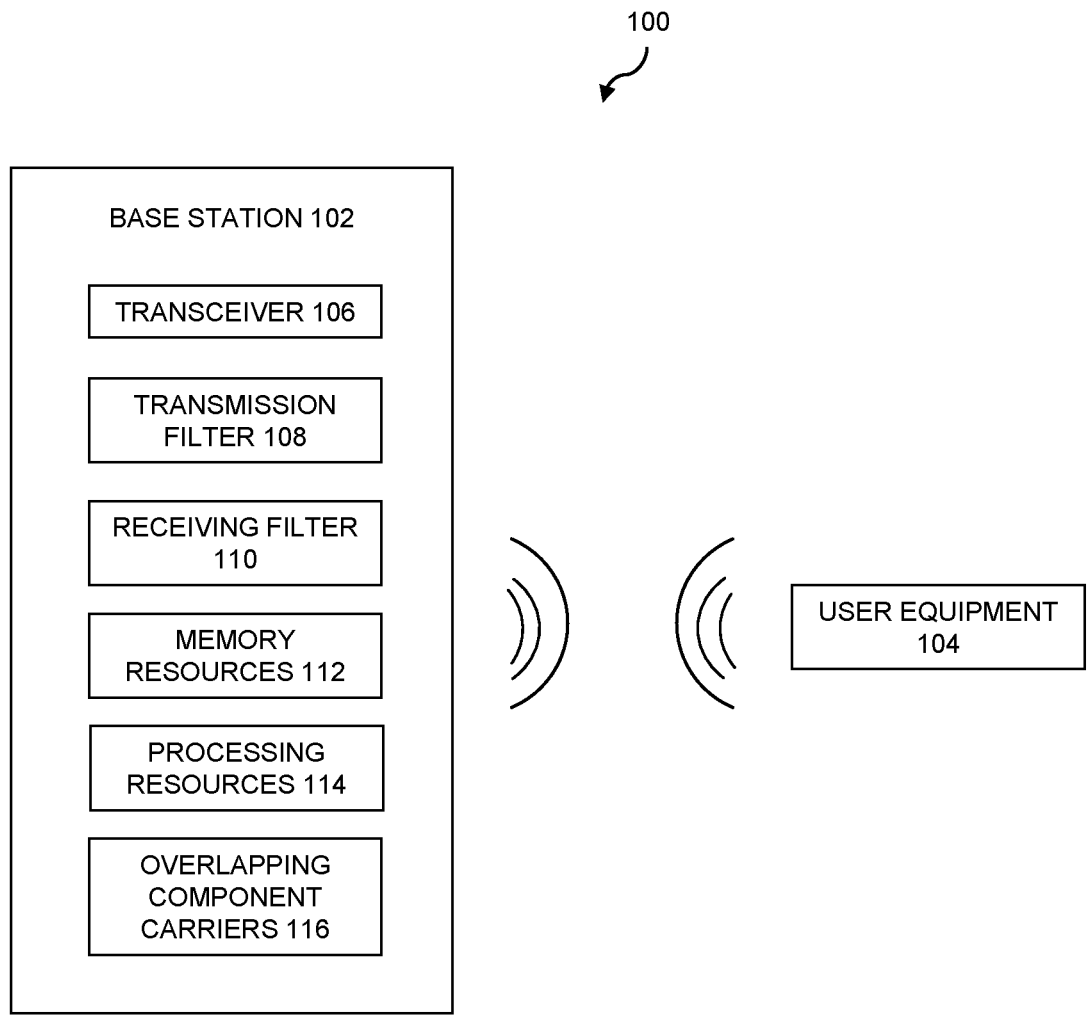
FIG. 1 is a block diagram of a wireless communication system, according to one embodiment.

FIG. 1 is a block diagram of a wireless communication system 100, according to one embodiment. The wireless communication system 100 includes a base station 102 and a UE 104. The base station 102 enables the UE 104 to communicate with other UEs or to send and receive data via the Internet.

The base station 102 includes a transceiver 106, a transmission filter 108, a receiving filter 110, memory resources 112, and processing resources 114. The transceiver 106 transmits mobile communication signals to the UE 104, to other base stations, and to other communication systems to enable mobile communication and access to the Internet. The memory resources 112 include one or more computer readable media that store software instructions for establishing a mobile communication network with the base station 102. The processing resources 114 execute the instructions stored in one or more computer readable media of the memory resources 112. As set forth in more detail below, executing the software instructions causes the base station 102 to establish overlapping component carriers 116.

In one embodiment, the communication system 100 is a 3GPP network. The communication system 100 can include a new radio (NR) fifth generation (5G) network. The communication system 100 can include other types of networks without departing from the scope of the present disclosure.

3GPP standards have defined specific bandwidths that can be utilized by 5G NR UE. In particular, UEs can utilize bandwidths of 5 MHz, 10 MHz, 15 MHz, 20 MHz, etc. 3GPP standards do not provide for UEs utilizing bandwidths between the specified 5 MHz, 10 MHz, 15 MHz, 20 MHz, etc.

Organizations and companies that wish to provide wireless communication network services typically purchase the rights to a particular portion of wireless spectrum. For example, 3GPP standards define a large number of evolved universal mobile telecommunications system (E-UTRA) bands in the radio frequency spectrum. Wireless service providers can purchase, license, or otherwise acquire bandwidth within one or more of these bands and can then provide mobile communication services within that portion of the band.

Bandwidth can be very expensive. In the United States, some organizations pay billions of dollars for bandwidth in various regions. Due to the high cost of bandwidth, it is expensive to purchase an amount of bandwidth that falls between the specific bandwidths that can be utilized by UEs. Organizations typically seeks to purchase an amount of bandwidth that corresponds to one of the specified bandwidths that can be utilized by UEs in order to avoid wasting any excess bandwidth. In other words, organizations typically seek to purchase bandwidths of 5 MHz, 10 MHz, 15 MHz, 20 MHz, etc. so that there is not leftover bandwidth between the specified 5 MHz, 10 MHz etc.

Nevertheless, due to the complex licensing, optioning, and purchasing of bandwidth by various organizations, oftentimes organizations end up with rights to utilize an odd amount of bandwidth. As used herein, an odd amount of bandwidth corresponds to an amount of bandwidth that falls between specific bandwidths authorized for UEs by 3GPP standards. In this situation, one possible solution is to simply leave the leftover bandwidth unused. This results in a large spectrum inefficiency. For example, if an organization owns the rights to a bandwidth of 7 MHz, the organization could define a 5 MHz system and leave the remaining 2 MHz of bandwidth unused. This corresponds to approximately 35% of the purchased bandwidth going unused.

The wireless communication system 100 addresses this issue by defining multiple component carriers that overlap with each other within the purchased bandwidth. Accordingly, the base station 102 of the communication system 100 defines overlapping component carriers 116. The component carriers overlap with each other in the sense that their defined frequency bands overlap with each other.

The wireless communication system 100 utilizes intraband overlapping component carriers. Accordingly, the communication system 100 utilizes two or more component carriers that overlap with each other in the frequency spectrum. Each component carrier has a bandwidth that is less than the total bandwidth of the network. In an example in which the communication system 100 utilizes two component carriers, a first component carrier has a bandwidth that begins at the beginning of the allotted network bandwidth. A second component carrier has a bandwidth that begins at a frequency that is intermediate to the bandwidth of the first component carrier and that ends at the end of the total network bandwidth. Accordingly, a portion of the first component carrier overlaps with a portion of the second component carrier.

One result of the overlapping component carriers is that none of the network bandwidth is wasted. Another result of the overlapping component carriers is that none of the component carriers extend into the bandwidth of neighboring networks or systems. Accordingly, the wireless communication system 100 efficiently uses its full network bandwidth.

In one example, in accordance with one embodiment, the wireless communication system 100 has access to 7 MHz of bandwidth in LTE band 26. The wireless communication system 100 defines a first component carrier and a second component carrier within the 7 MHz of bandwidth. Each component carrier is a 5 MHz component carrier in accordance with 3GPP standards. However, the component carriers overlap with each other. If the first component carrier begins at the beginning of the network bandwidth and the second component carrier ends at the end of the network bandwidth, then the overlapping bandwidth of the two component carriers is about 3 MHz. As will be set forth in more detail below, the wireless communication system 100 manages the types of signals that are transmitted over the two component carriers such that efficient use is made of network resources.

Continuing with the example in which the wireless communication system 100 has access to 7 MHz of bandwidth, in practice, the two component carriers each include 4.5 MHz of bandwidth, rather than a full 5 MHz. This is because there are guard bands defined at the beginning and the end of the network bandwidth. In particular, a first guard band of 0.25 MHz is established at the beginning of the network bandwidth. A second guard band of 0.25 MHz is established at the end of the available network bandwidth. The result is that there is about 2.5 MHz of overlap between the two component carriers.

Each component carrier is divided into 25 physical resource blocks (PRB). Each PRB has a bandwidth of about 180 kHz. The PRB defines the smallest unit used by a scheduling algorithm. Therefore, the minimal scheduled user transmission on the shared channel is one PRB. In the example in which the network bandwidth is 7 MHz, the overlapping portion of the two component carriers is about 14 PRBs. The communication system 100 defines how the overlapping PRBs will be utilized.

In one embodiment, in order to comply with 3GPP channel bandwidth, the base station 102 will be configured as a channel having a bandwidth that is the sum of the bandwidths of all of the component carriers without considering whether or not any of the bandwidths overlap. In an example in which the network bandwidth is 7 MHz and there are two overlapping component carriers, the base station will be configured as a 10 MHz channel because each component carrier is 5 MHz. For other network bandwidths and other numbers of component carriers, the base station 102 will be configured as a channel having a bandwidth that is the sum of the bandwidths of all the component carriers.

In one embodiment, the base station 102 includes a transmission filter 108. The transmission filter 108 is a bandpass filter with a strict passband. The passband corresponds to the bandwidth that is assigned for the base station 102. Any signals with frequencies outside the passband are filtered so that they are not transmitted from the base station 102. This can help ensure that transmissions from the base station 102 do not infringe on bandwidth assigned to adjacent networks.

In one example, the communication system 100 has rights to a 7 MHz in LTE band 26. The transmission filter 108 establishes passband corresponding to the designated 7 MHz of bandwidth. Signals outside the designated 7 MHz will not be transmitted from the base station 102 based, in part, on the transmission filter 108.

In one embodiment, the base station 102 includes a receiving filter 110. The receiving filter 110 is configured to ensure that the base station 102 will reject any signals outside of its designated bandwidth. Accordingly, the receiving filter 110 is a bandpass filter with a strict passband corresponding to the assigned bandwidth of the communication system 100. Thus, communications from networks in neighboring bandwidths will not be received by the base station 102.

In the example in which the communication system 100 has rights to 7 MHz of bandwidth in LTE band 26. The receiving filter 110 establishes passband corresponding to the designated 7 MHz of bandwidth. Signals outside the designated 7 MHz will not be received by the base station 102 based, in part, on the transmission filter 108.

In one embodiment, no modifications for filtering changes are needed in the UE 104. The UE 104 operating in accordance with 3GPP standards can send and receive signals in the bandwidth of the communication system 100 even utilizing overlapping component carriers 116. The base station 102 defines the overlapping component carriers 116, as well as the frequency bands for each component carrier. The user content 104 can operate in accordance with this configuration without further modification.

Examples have been given in which the overlapping component carriers 116 include two overlapping component carriers. However, the overlapping component carriers 116 can include more than two component carriers. For example, the overlapping component carriers 116 can include three or more component carriers.

In one embodiment, there are three component carriers in the overlapping component carriers 116. A first component carrier overlaps with a second component carrier. A second component carrier overlaps with the first component carrier. A third component carrier may be contiguous with the second component carrier or may overlap with a portion of the second component carrier. and a third component carrier. The second component carrier includes a portion that does not overlap with either the first or the third component carrier. Those of skill in the art will recognize, in light of the present disclosure, that many configurations of component carriers can be utilized without departing from the scope of the present disclosure.

Examples have been given in which the network bandwidth is 7 MHz. However, other nonstandard network bandwidths can be utilized in accordance with principles of the present disclosure. For example, network bandwidth could be between 5 MHz and 10 MHz, between 10 MHz and 15 MHz, between MHz and 20 MHz, etc. Varying numbers of component carriers can be utilized in these situations. For example, if the network bandwidth is 13 MHz, then the overlapping component carriers 116 can include three 5 MHz component carriers that overlap in the manner described above. In another example, if the network bandwidth is 17 MHz, then the overlapping component carriers 116 can include four 5 MHz component carriers.

In accordance with 3GPP standards for 5G NR systems, downlink synchronization within the wireless communication system 100 is accomplished using synchronization signal blocks (SSBs). The SSBs are transmitted from the base station 102 to the UE 104 at regular intervals based on a selected periodicity. The SSBs enable the UE 104 to acquire time and frequency synchronization with a cell and decode the Cell ID of that cell. This enables the UE 104 to read system information blocks (SIBs) from the base station 102, as will be described in more detail below.

Each SSB includes multiple components. In particular, each SSB includes a primary synchronization signal (PSS), a secondary synchronization signal (SSS) and a physical broadcast channel (PBCH). These signals facilitate synchronization between the base station 102 and the UE 104.

Before cell synchronization has taken place, the UE 104 will scan, with its radio, through different frequency channels depending on which bands it is supporting. When it is tuned to the band of the communication system 100, the UE first finds the PSS of the SSB. The PSS provides a radio frame boundary corresponding to a position of a first symbol in a radio frame. This enables the UE to be synchronized on a subframe level. The PSS is repeated in the same location in the same subframe of each SSB. From the PSS, the UE is able to obtain a physical layer identity.

After the UE 104 has obtained the PSS, the UE 104 finds the SSS. The SSS provides a subframe boundary corresponding to a position of a first symbol in a sub frame. After obtaining both the PSS and the SSS, the UE 104 is able to obtain a physical layer cell identity group number.

After obtaining the PSS and SSS, the UE 104 is able to acquire time instants of the PBCH. The center frequency of the PSS and SSS is aligned with the center frequency of the PBCH. Accordingly, synching with the PSS and SSS enables acquisition of the PBCH. The PBCH carries major information blocks (MIB). The MIBs facilitate system acquisition for the UE 104. In particular, the MIBs include the parameters needed to decode system information blocks (SIB).

SIBs enable attachment of a UE 104 to the communication network. Once uplink synchronization between the UE 104 and the network has been established and the UE 104 has read the MIB, the UE 104 waits for SIB type 1 which carries cell access related information and supplies the UE 104 with the scheduling of other SIBs. Reading SIB type 1 enables the UE 104 to gain access to the network. Without reading SIB type 1, the UE 104 will not know about the sequences it has to transmit in PRACH or the transmit power at which the base station is transmitting.

3GPP standards also provide for control resource sets (CORESET). The CORESET is a set of physical resources, i.e. a specific area on NR downlink resource grid. The CORESET includes a set of parameters used to carry the physical downlink control channel (PDCCH) that carries the downlink control information (DCI). CORESET is localized to a specific region in the frequency domain. Bandwidth part is a contiguous set of PRBs on a given carrier. These PRBs are selected from a contiguous subset of the common resource blocks for a given numerology.

In one embodiment, the base station 102 sends two SSBs on the overlapping component carriers 106. In particular, the base station 102 sends first SSBs on a first component carrier and second SSBs on a second component carrier. The first and second SSBs are sent with a timing selected to promote effective use of the network bandwidth.

In one embodiment, the base station 102 sends two SSBs on the overlapping component carriers 106. In particular, the base station 102 sends first SSBs on a first component carrier and second SSBs on a second component carrier. The first and second SSBs are sent with a timing selected to promote effective use of the network bandwidth.

In one embodiment, the first and second SSBs are staggered in time. The first SSB is sent on the first component carrier. After the first SSB is sent on the first component carrier, the second SSB is sent on the second component carrier. After the second SSB is sent on the second component carrier, the first SSB is again sent on the first component carrier. This continues such that the first and second SSBs are interleaved with each other in time.

In one embodiment, the PBCH on the first SSB carries first MIBs. Accordingly, the first component carrier sends out first SSBs that include a PBCH carrying first MIBs. The first MIBs assist the UE 104 to acquire a network connection with the base station 102.

In one embodiment, the PBCH on the second SSB carries second MIBs. Accordingly, the first component carrier sends out first SSBs that include a PBCH carrying second MIBs. The second MIBs assist the UE to acquire a network connection with the base station 102.

In one embodiment, both the first MIBs and the second MIBs point to the same SIBs. Thus, the first and second MIBs do not point to different SIBs. Instead, the first and second MIBs point to the same SIBs.

In one embodiment, the SIBs are located on the overlapping portion of the network bandwidth. In other words, the SIBs are located at frequencies that correspond to the portion of the network bandwidth at which the first and second component carriers overlap. The SIBs may be sent exclusively at those frequencies that correspond to the overlapping portions of the first and second component carriers.

In one embodiment, the base station 102 sends two CORESET0s on the overlapping component carriers 106. In particular, the base station 102 sends the first CORESET0 on a first component carrier and a second CORESET0 on the second component carrier. The first and second CORESET0s are sent with a timing selected to promote effective use of the network bandwidth.

In one embodiment, the first and second CORESET0s are staggered in time. The CORESET0 is sent on the first component carrier. After the first CORESET0 is sent on the first component carrier, the second CORESET0 is sent on the second component carrier. After the second CORESET0 is sent on the second component carrier, the first CORESET0 is again sent on the first component carrier. This continues such that the first and second CORESET0s are interleaved with each other in time.

In one embodiment, there are effectively two BWPs from a point of view of the scheduler of the base station 102. A first group of UEs 104 are on the first BWP. A second group of UEs 104 are on the second BWP. In this way, the overlapping carrier components 116 are utilized to support multiple groups of UEs 104.

In 3GPP 5G NR standards, the channel on the uplink for synchronization is the physical random-access channel (PRACH). The PRACH opportunity is defined in SIBs associated with SSBs. In one embodiment, the system 100 can have two PRACH opportunities. In particular, the system 100 can include a first PRACH opportunity in a portion of the network bandwidth corresponding to the nonoverlapping portion of the first component carrier. the system 100 can include a second PRACH opportunity in a portion of the network bandwidth corresponding to the nonoverlapping portion of the second component carrier.

In one embodiment, the system 100 defines a single PRACH opportunity. The single PRACH opportunity is located in the portion of the network bandwidth that corresponds to the overlapping portions of the first and second component carriers.

In one embodiment, because the first and second SSB's are interleaved in time, a UE 104 scanning for SSBs will first encounter a first SSB or a second SSB with equal probabilities. Thus, there is an equal chance that a UE 104 will anchor to the first component carrier or the second component carrier. Accordingly, probabilistically, if a large number of UEs 104 are connected to the base station 102, approximately half of the UEs 104 will be connected to the first component carrier and approximately half of the UEs 104 will be connected to the second component carrier.

Nevertheless, it is possible that at a specific point in time one component carrier may have a significantly higher load than the other component carrier. In this case, in one embodiment, the base station 102 can adjust the periodicity TSS at which one or both of the first and second SSBs are transmitted. 3GPP standards currently indicate that a default TSS for SSBs is 20 ms. This means that SSBs are transmitted ever 20 ms. However, 3GPP standards currently allow TSS of 5 ms, 10 ms, 20 ms, 40 ms, 80 ms, or 160 ms. Accordingly, the base station 102 can adjust the TSS of one or both of the first and second SSBs in order to change the likelihood that a UE 104 will connect with one or the other component carriers.

In one embodiment, if one component carrier has a significantly higher load than the other component carrier, then the base station 102 can reduce TSS for the more lightly loaded component carrier. In one example, the default TSS is 20 ms for both the first and the second SSBs. When a load imbalance is present, TSS for the SSBs of the more lightly loaded component carrier is reduced to 5 ms while the TSS for the more heavily loaded component carrier remains at 20 ms. In this case, 4 SSBs for the more lightly loaded component carrier will be transmitted for each SSB of the more heavily loaded component carrier. This greatly increases the probability that UEs 104 will attach to the more lightly loaded component carrier. Once the two component carriers are sufficiently load balanced again, the base station 102 returns the TSS of the previously lightly loaded component carrier to the default value.

In one embodiment, the base station 102 includes a packet scheduler that schedules data packets to be provided to the UE 104 and to be provided by the UE 104. In particular, after the base station 102 has established a connection with the UE 104, the base station 102 can provide data packets to the UE 104 and can receive data packets from the UE 104. The data packets can include voice data for a phone call, data provided by a web server to the UE 104, data provided by the UE 104 to a web server, or other types of data commonly exchanged on wireless communication networks.

In one example, the UE 104 is a smart phone. After the UE 104 has established a network connection with the base station 102 resulting, in part, from receiving SSBs, decoding SIBs, and receiving CORESET0, a user of the UE 104 may select to stream a video on an application of the UE 104 via the Internet. The video stream is provided to the UE 104 in data packets from the base station 102.

In one embodiment, the packet scheduler of the base station 102 can schedule data packets on all of the component carriers. In an example in which there is a first component carrier and a second component carrier, the packet scheduler of the base station 102 can schedule data packets on both the first component carrier and the second component carrier.

Figure 2A:
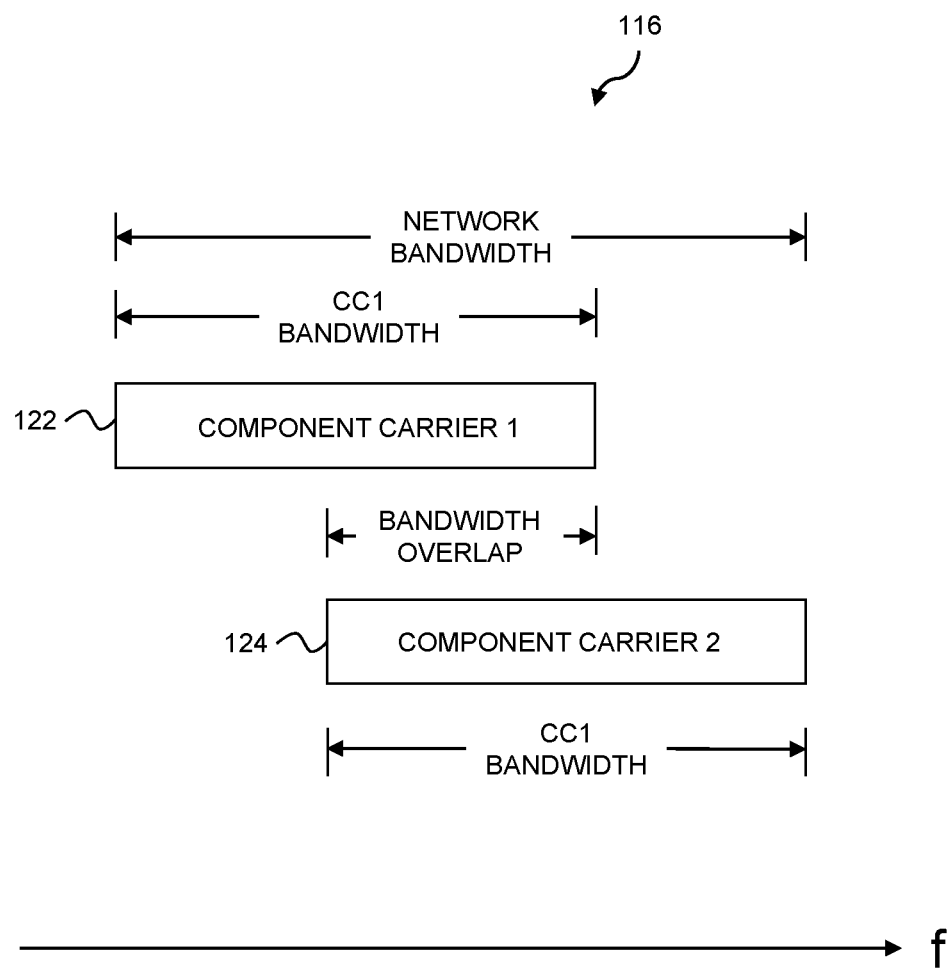
FIG. 2A is a representation of overlapping component carriers, according to one embodiment.

FIG. 2A is a representation of overlapping component carriers 116, according to one embodiment. The base station 102 transmits and receives signals over the span of the network bandwidth allotted to the base station 102. The base station 102 utilizes the overlapping component carriers 116.

In the example of FIG. 2A, the base station 102 defines a first component carrier 122 and a second component carrier 124. The first component carrier 122 has a bandwidth that is less than the total network bandwidth. The second component carrier 124 has a bandwidth that is less than the total network bandwidth. The bandwidth of the first component carrier 122 overlaps with the bandwidth of the second component carrier 124. The bandwidth of the first component carrier 122 begins at the beginning of the network bandwidth. The bandwidth of the second component carrier 124 ends at the end of the network bandwidth.

Though not shown in FIG. 2A, in practice, there may, additionally, be guard bands present. A first guard band may buffer a beginning of the bandwidth of the first component carrier 122 from the beginning of the network bandwidth. A second guard band may buffer the end of the second component carrier 124 from the end of the network bandwidth.

Figure 2B:
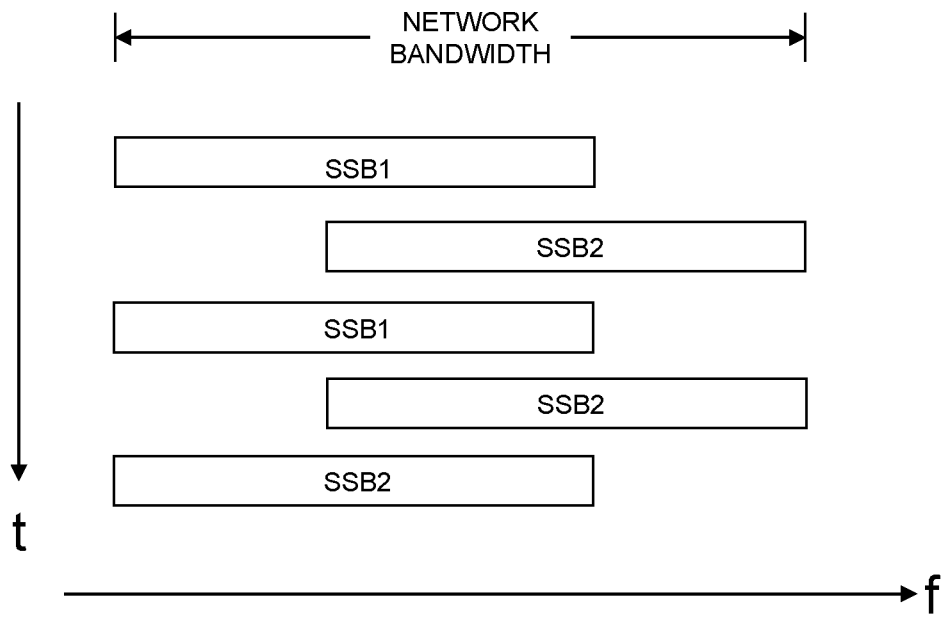
FIG. 2B is a representation of the frequency and timing disposition of first and second synchronization signal blocks associated with the overlapping component carriers of FIG. 2A under balanced load conditions, according to one embodiment.

FIG. 2B is a representation of the frequency and timing disposition of first and second SSBs associated with the overlapping component carriers 116 of FIG. 2A under balanced load conditions, according to one embodiment. In the example of FIG. 2B, the base station 102 sends first SSBs (SSB1) on frequencies associated with the first component carrier 122. The base station 102 sends second SSBs (SSB2) on frequencies associated with the second component carrier 124.

In one embodiment, SSB1 and SSB2 are interleaved in time. In the example of FIG. 2B, the base station 102 first outputs SSB1. After the base station 102 outputs SSB1, the base station 102 outputs SSB2. After the base station 102 outputs SSB2, the base station again outputs SSB1. This pattern continues such that the first and second SSBs are interleaved with each other in time.

In one embodiment, TSS for SSB1 is 20 ms. Accordingly, every 20 ms SSB1 is output by the base station 102. In one embodiment, TSS for SSB2 is also 20 ms, but interleaved with SSB1. Accordingly, every 20 ms the base station 102 outputs SSB2. Other values for TSS are possible without departing from the scope of the present disclosure.

Though not shown in FIG. 2B, a first CORESET0 signal can be transmitted in a same portion of the network bandwidth as SSB1. A second CORESET0 signal can be transmitted in a same portion of the network bandwidth as SSB2.

Figure 2C:
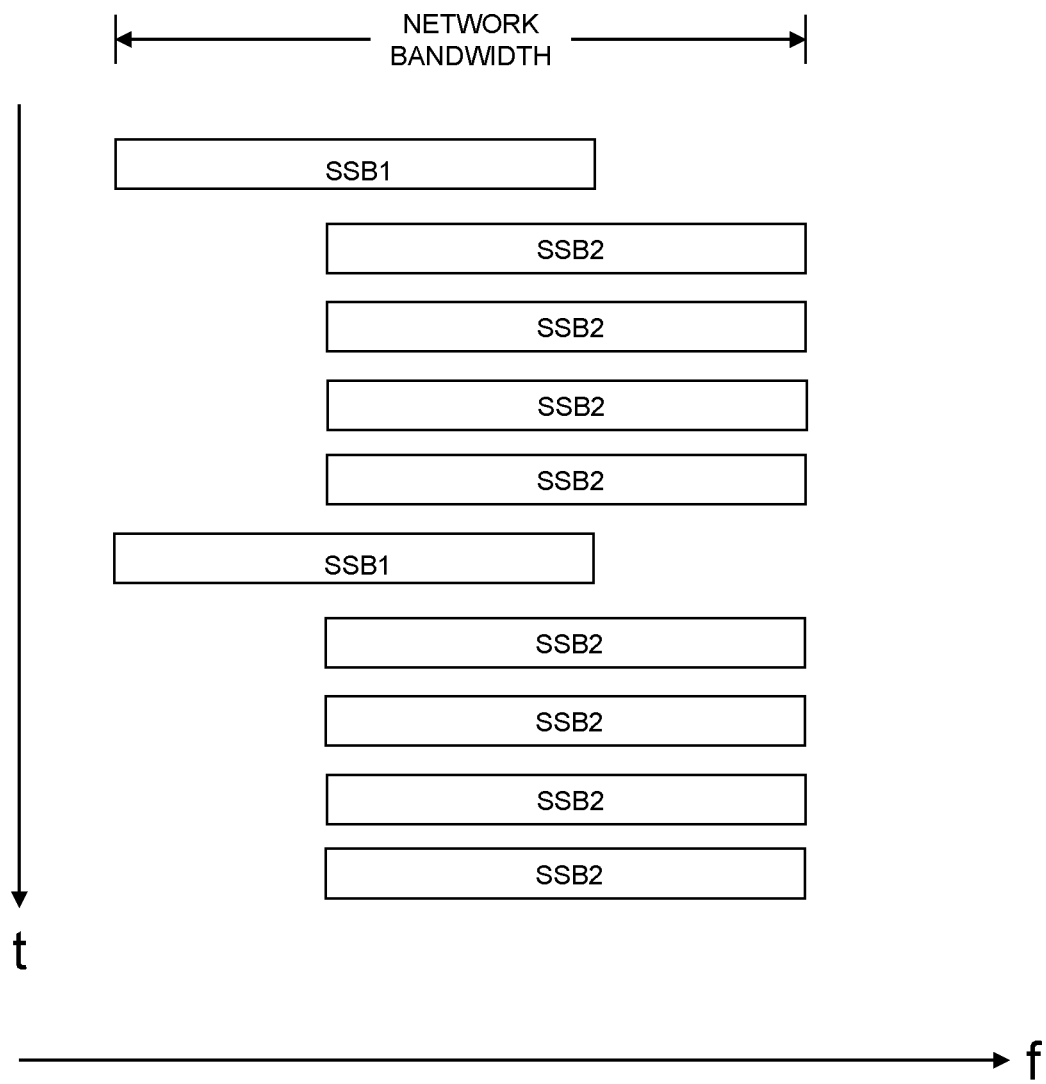
FIG. 2C is a representation of the frequency and timing disposition of first and second synchronization signal blocks associated with the overlapping component carriers of FIG. 2A in a load imbalanced situation, according to one embodiment.

FIG. 2C is a representation of the frequency and timing disposition of first and second SSBs associated with the overlapping component carriers 116 of FIG. 2A in a load imbalanced situation, according to one embodiment. In the example of FIG. 2C, the first component carrier 122 is attached to a significantly higher proportion or number of UEs 104 than is the second component carrier 124. Accordingly, the base station 102 undertakes a load balancing procedure in which the base station 102 reduces TSS of SSB2 to ensure that SSB2 is output more frequently than is SSB1. The result is that UEs 104 are more likely to receive SSB2 and connect to the network via SSB2 than via SSB1.

In the example of FIG. 2C, TSS of SSB1 is 20 ms. TSS of SSB2 is 5 ms. The base station 102 first outputs SSB1. The base station 102 then outputs SSB2. Due to the reduced value of TSS for SSB2, the base station 102 outputs SSB2 four times before SSB1 is output again. This continues until the proportion of UEs 104 attached to the second component carrier 124 is balanced with the proportion of UEs 104 attached to the first component carrier 122. After the load is balanced, the base station 102 returns TSS of SSB2 to the default value as illustrated in FIG. 2B. Other values and changes in value for TSS can be utilized without departing from the scope of the present disclosure.

In one embodiment, there is a threshold proportional imbalance or a threshold numerical imbalance that triggers the base station 102 to reduce TSS of either SSB1 or SSB2. In one embodiment, there is a threshold proportional or numerical balance that triggers the base station to return TSS to the default value.

Figure 2D:
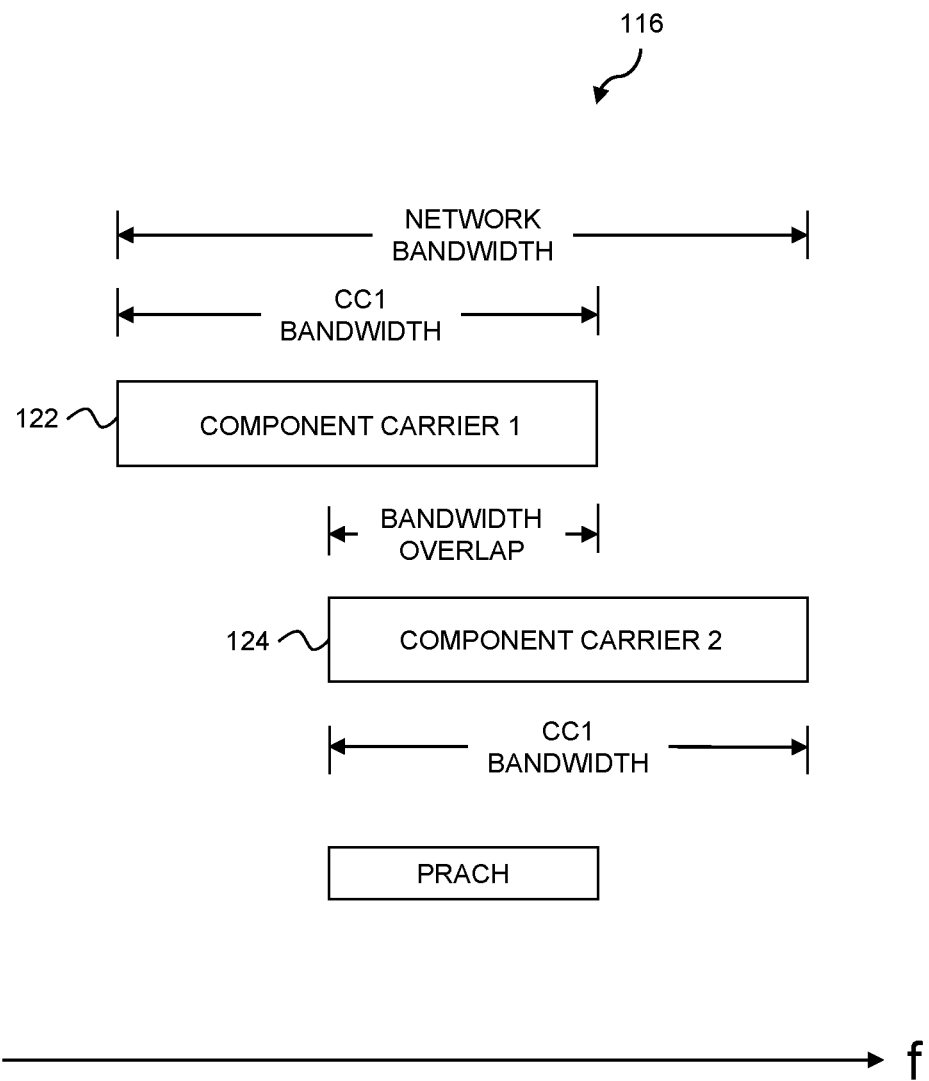
FIG. 2D is a representation of overlapping component carriers including an indication of frequencies for physical random-access channel signals, according to one embodiment.

FIG. 2D is a representation of overlapping component carriers 116 including an indication of frequencies for PRACH signals, according to one embodiment. In the example of FIG. 2D, the system 100 defines a single PRACH opportunity. The single PRACH opportunity is located in the portion of the network bandwidth that corresponds to the overlapping portions of the first and second component carriers 122, 124.

Figure 2E:
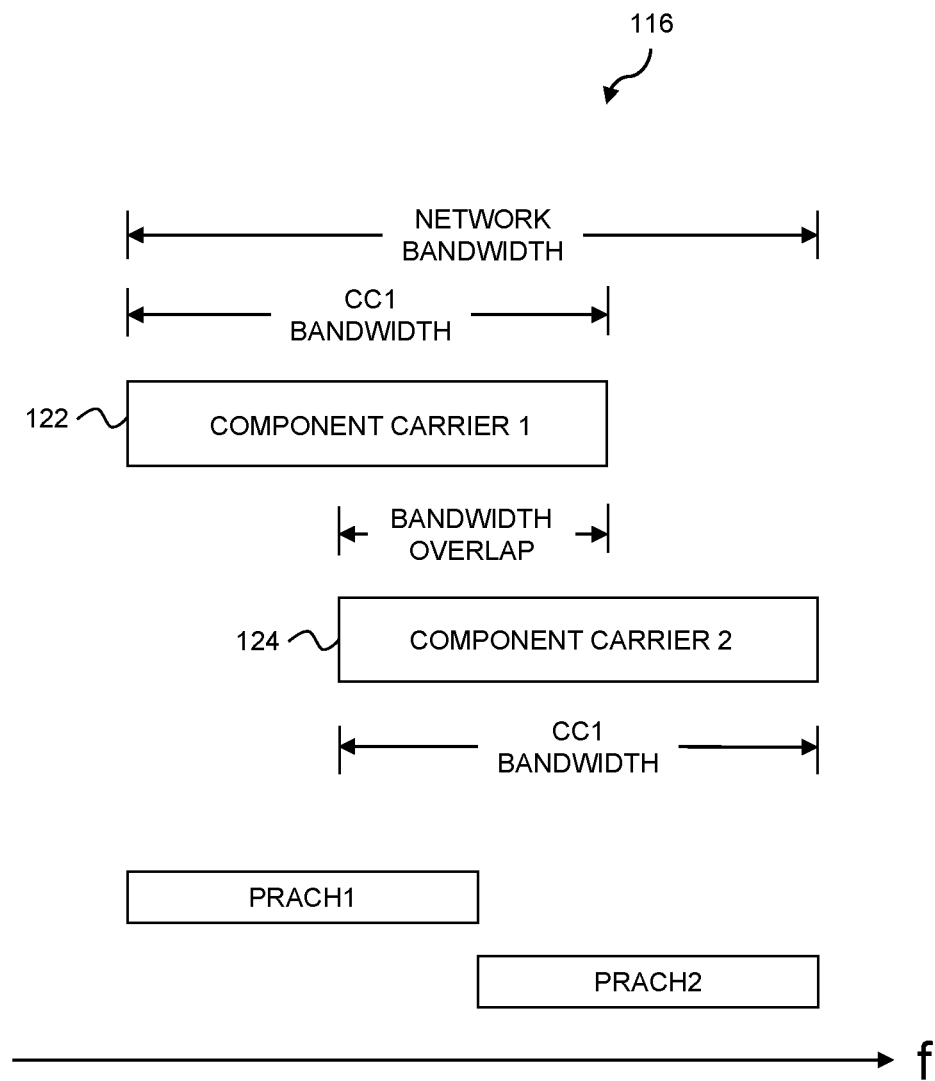
FIG. 2E is a representation of overlapping component carriers including an indication of frequencies for physical random-access channel signals, according to one embodiment.

FIG. 2E is a representation of overlapping component carriers 116 including an indication of frequencies for PRACH signals, according to one embodiment. In one embodiment, the system 100 can have two PRACH opportunities. In particular, the system 100 can include a first PRACH opportunity in a portion of the network bandwidth corresponding to the nonoverlapping portion of the first component carrier 122. The system 100 can include a second PRACH opportunity in a portion of the network bandwidth corresponding to the nonoverlapping portion of the second component carrier 122.

Figure 3:
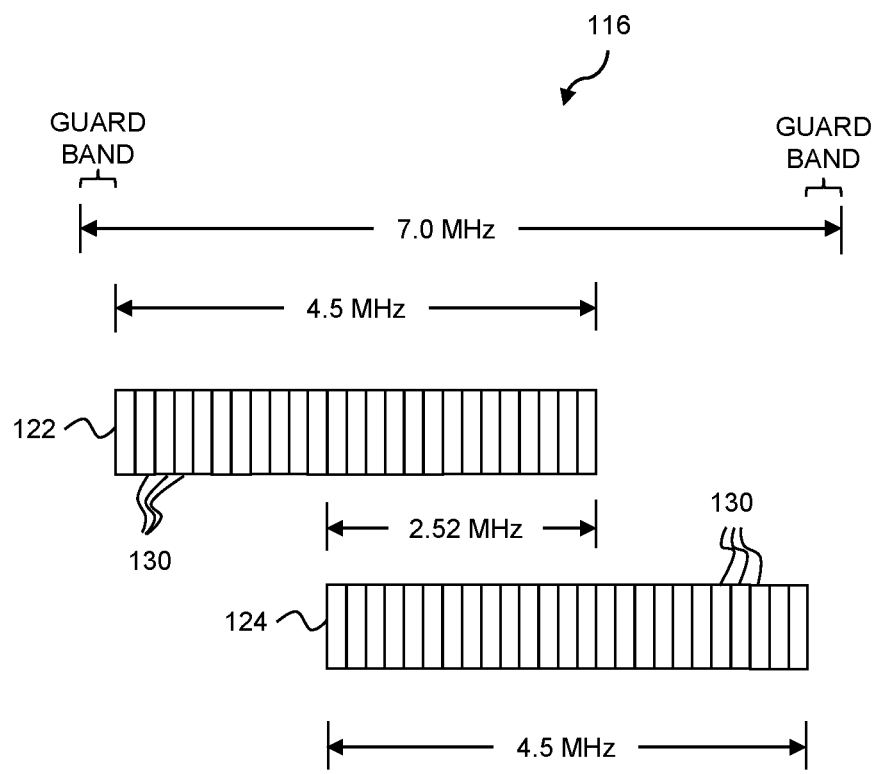
FIG. 3 is a representation of overlapping component carriers, according to one embodiment.

FIG. 3 is a representation of overlapping component carriers 116, according to one embodiment. In the example of FIG. 3, the network bandwidth is 7 MHz. In the example of FIG. 3, the base station 102 defines a first component carrier 122 and a second component carrier 124. The first component carrier 122 has a bandwidth of 4.5 MHz. The second component carrier 124 has a bandwidth of 4.5 MHz. A guard band of 0.25 MHz separates a beginning of the first component carrier 122 from a beginning of the network bandwidth. A guard band of 0.27 MHz separates an end of the second component carrier 124 from an end of the network bandwidth. The guard bands help ensure that the component carriers 122, 124 do not carry any signals in frequencies outside the allotted network bandwidth.

In standard carrier aggregation, each component carrier is allotted 5 MHz of bandwidth. 4.5 MHz of the component carrier is used for carrying signals between the base station 102 and the UE 104. 0.25 MHz is included on both ends of the component carrier as guard bands.

In the overlapping component carriers 116 of FIG. 3, there is a guard band before the first component carrier 122 and a guard band at the end of the second component carrier 124.

Each of the component carriers 122, 124 includes 25 physical resource blocks (PRB) 130. Each PRB 130 includes 12 subcarriers. Each PRB has a bandwidth of 180 kHz. In the example of FIG. 3, the first component carrier 122 and the second component carrier 124 have 2.52 MHz of overlapping bandwidth. This corresponds to 14 overlapping PRBs 130.

In one embodiment, all 25 PRBs of the first component carrier 122 can be utilized to provide SSB1 and the first CORESET0. All 25 PRBs of the second component carrier 124 can be utilized to provide SSB2 and the second CORESET0. Because these signals are interleaved in time, the overlapping PRBs can be utilized for both the first and the second component carriers 122, 124.

In one embodiment the SIBs are provided entirely on the overlapping PRBs. In one embodiment PRACH is provided entirely on the overlapping PRBs. Alternatively, PRACH1 may be provided on the first 18 PRBs of the first component carrier 122, while PRACH2 may be provided on the last 18 PRBs of the second component carrier 124. Data packets may be scheduled on all 25 PRBs of both the first and the second component carriers 122, 124.

Figure 4:
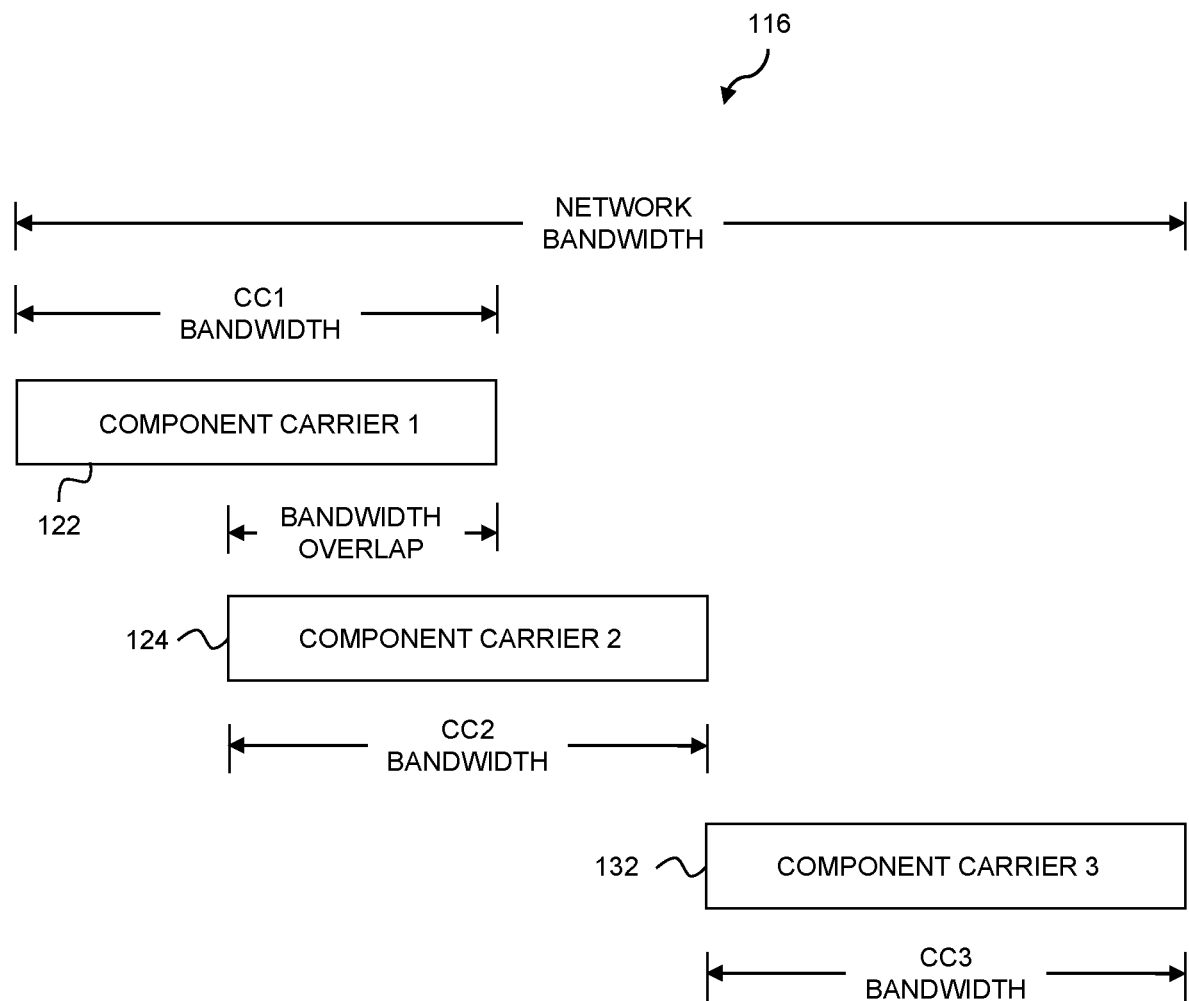
FIG. 4 is a representation of overlapping component carriers, according to one embodiment.

FIG. 4 is a representation of overlapping component carriers 116, according to one embodiment. The base station 102 transmits and receives signals over the span of the network bandwidth allotted to the base station 102. The base station 102 utilizes the overlapping component carriers 116 in a carrier aggregation configuration.

In the example of FIG. 4, the base station 102 defines a first component carrier 122, a second component carrier 124, and a third component carrier 132. The first component carrier 122 has a bandwidth that is less than the total network bandwidth. The second component carrier 124 has a bandwidth that is less than the total network bandwidth. The third component carrier 132 has a bandwidth that is less than the total network bandwidth. The bandwidth of the first component carrier 122 overlaps with the bandwidth of the second component carrier 124. The bandwidth of the third component carrier 132 begins at the end of the bandwidth of the second component carrier 124. In other words, the bandwidth of the third component carrier 132 is contiguous with the bandwidth of the second component carrier 124. The bandwidth of the first component carrier 122 begins at the beginning of the network bandwidth. The bandwidth of the third component carrier 132 ends at the end of the network bandwidth.

In one embodiment, bandwidths of the first and second component carriers 122, 124 can be utilized as described in relation to FIGS. 2A-3. The bandwidth of the third component carrier 132 can be utilized to provide SSBs, PRACH, SIBs, CORESET0, data packets, and other types of signals in any suitable manner.

FIG. 5 is a flow diagram of a method 500, according to one embodiment. At 502, the method 500 includes establishing, with a base station, a first component carrier having a first frequency band. At 504, the method 500 includes establishing, with the base station, a second component carrier having a second frequency band that overlaps the first frequency band. At 506, the method 500 includes transmitting, from the base station, first synchronization signal blocks in the first frequency band. At 508, the method 500 includes transmitting, from the base station, second synchronization signal blocks in the second frequency band and interleaved in time with the first synchronization signal blocks.

FIG. 6 is a flow diagram of a method 600, according to one embodiment. At 602, the method 600 includes establishing, with a new radio compliant base station, a first component carrier having a first frequency bandwidth. At 604, the method 600 includes establishing, with the base station, a second component carrier having a second frequency bandwidth that overlaps with the first frequency bandwidth. At 606, the method 600 includes transmitting, from the base station, first synchronization signal blocks on the first component carrier. At 608, the method 600 includes transmitting, from the base station, second synchronization signal blocks on the second component carrier and interleaved in time with the first synchronization signal blocks. At 610, the method 600 includes adjusting a periodicity of the second synchronization signal blocks from a default periodicity responsive to a load imbalance between the first and second component carriers.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    establishing, with a base station, a first component carrier having a first frequency band;
    establishing, with the base station, a second component carrier having a second frequency band that overlaps the first frequency band;
    transmitting, from the base station, first synchronization signal blocks in the first frequency band;
    transmitting, from the base station, second synchronization signal blocks in the second frequency band and interleaved in time with the first synchronization signal blocks; and
    transmitting system information blocks from the base station exclusively on frequencies corresponding to an overlap between the first and second frequency bands.

2. The method of claim 1, further comprising:
    transmitting a first control resource set in the first frequency band; and
    transmitting a second control resource set in the second frequency band.

3. The method of claim 1, further comprising:
    transmitting a first physical random-access channel in the first frequency band; and
    transmitting a second physical random-access channel in the second frequency band.

4. The method of claim 3, wherein the first physical random-access channel is not transmitted at frequencies that overlap with the second physical random-access channel.

5. The method of claim 1, further comprising establishing a transmission passband with a transmission filter of the base station, wherein the transmission passband ensures that the base station only transmits signals with an allotted bandwidth of the base station.

6. The method of claim 5, further comprising establishing a receiving passband with a receiving filter of the base station, wherein the receiving passband ensures that the base station only receives signals within the allotted bandwidth of the base station.

7. The method of claim 1, wherein the base station is a 5G new radio base station.

8. The method of claim 1, wherein the overlapping first and second component carriers comply with 3GPP standards.

9. A base station, comprising:
    a transceiver configured to transmit and receive signals;
    one or more processors coupled to the transceiver; and
    one or more computer readable media including instructions that, when executed by the one or more processors, perform a process including:
        establishing, at least in part with the transceiver, a first component carrier having a first frequency band;

establishing, at least in part with the transceiver, a second component carrier having a second frequency band that overlaps with the first frequency band;

transmitting, from the base station, first synchronization signal blocks in the first frequency band;

transmitting, from the base station, second synchronization signal blocks in the second frequency band and interleaved in time with the first synchronization signal blocks; and transmitting system information blocks from the base station exclusively on frequencies corresponding to an overlap between the first and second frequency bands.

10. The base station of claim 9, further comprising a transmission filter that establishes a transmission passband that ensures that the transceiver only transmits signals within an allotted bandwidth.

11. The base station of claim 9, further comprising a receiving filter configured to establish a receiving passband that ensures that the transceiver only receives signals within an allotted bandwidth.

12. The base station of claim 11, wherein first and second component carriers each include a plurality of physical resource blocks.

13. The base station of claim 9, wherein the process further comprises:

transmitting a first control resource set in the first frequency band; and transmitting a second control resource set in the second frequency band.

14. The base station of claim 9, wherein the process further comprises:

transmitting a first physical random-access channel in the first frequency band; and transmitting a second physical random-access channel in the second frequency band.

15. The base station of claim 14, wherein the first physical random-access channel is not transmitted at frequencies that overlap with the second physical random-access channel.

16. The base station of claim 9, wherein the process further comprises establishing a transmission passband with a transmission filter of the base station, wherein the transmission passband ensures that the base station only transmits signals with an allotted bandwidth of the base station.

17. The base station of claim 9, wherein the process further comprises establishing a receiving passband with a receiving filter of the base station, wherein the receiving passband ensures that the base station only receives signals within the allotted bandwidth of the base station.

* * * * *